United States Patent
Shinoda et al.

(10) Patent No.: US 9,409,605 B2
(45) Date of Patent: Aug. 9, 2016

(54) VEHICLE BODY SIDE PART STRUCTURE

(71) Applicant: MAZDA MOTOR CORPORATION, Hiroshima (JP)

(72) Inventors: Masafumi Shinoda, Hiroshima (JP); Masakazu Tsuji, Higashi-Hiroshima (JP); Toshiharu Ikeda, Hiroshima (JP); Yoshikazu Nishimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/414,195

(22) PCT Filed: Feb. 26, 2013

(86) PCT No.: PCT/JP2013/001132
§ 371 (c)(1),
(2) Date: Jan. 12, 2015

(87) PCT Pub. No.: WO2014/020784
PCT Pub. Date: Feb. 6, 2014

(65) Prior Publication Data
US 2015/0175211 A1    Jun. 25, 2015

(30) Foreign Application Priority Data
Jul. 30, 2012 (JP) ................................ 2012-168769

(51) Int. Cl.
*B62D 25/00* (2006.01)
*B62D 25/04* (2006.01)
(52) U.S. Cl.
CPC ..................................... *B62D 25/04* (2013.01)
(58) Field of Classification Search
CPC .................................................... B62D 21/157
USPC .......................................... 296/193.06, 187.12
See application file for complete search history.

(56) References Cited

U.S. PATENT DOCUMENTS

| | | | | |
|---|---|---|---|---|
| 6,332,643 | B1 * | 12/2001 | Sukegawa | B62D 25/04 296/193.06 |
| 8,608,233 | B2 * | 12/2013 | Mori | B62D 25/04 296/187.12 |
| 2010/0194146 | A1 * | 8/2010 | Nishimura | B62D 21/157 296/193.06 |
| 2011/0010995 | A1 | 1/2011 | Okuda et al. | |
| 2012/0153680 | A1 | 6/2012 | May et al. | |

FOREIGN PATENT DOCUMENTS

| | | |
|---|---|---|
| CN | 202541645 U | 11/2012 |
| CN | 202624388 U | 12/2012 |
| DE | 202012000846 U1 | 7/2012 |

(Continued)

OTHER PUBLICATIONS

International Search Report; PCT/JP2013/001132; Jun. 4, 2013.

*Primary Examiner* — Joseph D Pape
(74) *Attorney, Agent, or Firm* — Studebaker & Brackett PC

(57) ABSTRACT

A structure is configured such that a viewer hardly feels strangeness of color tone or texture even when paint mist is attached to a center pillar 3 during coating of a body outer plate. A panel surface of an outer panel 35 of the center pillar 3 has a protrusion in a middle in the vehicle vertical direction such that at least part of a lower portion of the panel surface projects toward the outside of the vehicle body relative to an upper portion of the panel surface. A start end HL of the protrusion is located at substantially an identical height to a door body upper edge line UL in at least a center portion in a pillar width of the pillar outer panel.

7 Claims, 13 Drawing Sheets

(56) References Cited

FOREIGN PATENT DOCUMENTS

| JP | S55-161667 A | 11/1980 |
| JP | 2000-085620 A | 3/2000 |
| JP | S55-161667 A | 3/2000 |
| JP | 2006-272165 A | 10/2006 |
| JP | 2007-167720 A | 7/2007 |
| JP | 2012-116396 A | 6/2012 |
| RU | 116827 U1 | 12/2011 |
| WO | 2009/119318 A1 | 10/2009 |

* cited by examiner

VEHICLE BODY SIDE PART STRUCTURE

TECHNICAL FIELD

The present invention relates to a vehicle body side structure including a center pillar separating, in a vehicle longitudinal direction, an entrance opening that is covered and uncovered with a front door is from an entrance opening that is covered and uncovered with a rear door.

BACKGROUND ART

In coating the body of an automobile, a body inner plate including a center pillar is coated with the front door and the rear door being open, and then, the front door and the rear door are closed so that a body outer plate including outer panels of the front and rear doors is coated. Patent Document 1 describes that before coating of an outer panel of a vehicle body, suspended paint mist remaining in the body is released to the outside with the doors being open, and then the doors are closed so that the body outer panel is coated.

In coating the body outer panel, a laminated paint film including, for example, a metallic base paint film, a coloring base paint film, and a transparent clear paint film is formed. Regarding such a laminated paint film, Patent Document 2 describes that a lightness $L^*$ value of the metallic base paint film and a visible light transmittance of the coloring base paint film are defined in predetermined ranges in order to reduce color variations due to thickness variations, a frame phenomenon occurring in an edge portion, and a change in hue caused by polish repairs, and to obtain brightness and depth.

CITATION LIST

Patent Document

Patent Document 1: Japanese Unexamined Patent Publication No. 2006-272165

Patent Document 2: Japanese Unexamined Patent Publication No. 2007-167720

SUMMARY OF THE INVENTION

Technical Problem

The above-described vehicle body coating has a problem. This problem will be specifically described. FIG. 11 is a lateral cross-sectional view of a center pillar of a vehicle body. A center pillar 74 extends in a vehicle vertical direction and includes a pillar outer panel 71, a pillar reinforcement 72, and a pillar inner panel 73. The center pillar 74 separates an entrance opening that is covered and uncovered with a front door 75 of the body from an entrance opening that is covered and uncovered with a rear door 77 of the body, in a vehicle longitudinal direction. Although there is no relationship with the scope of the invention, a door sash 76 of the front door 75 and a door sash 78 of the rear door 77 are provided with garnishes 79 and 80 in order to make the doors 75 and 77 continuous in the vehicle longitudinal direction while the doors 75 and 77 are closed.

In FIG. 11, reference character 81 denotes a weatherstrip of the body, reference character 82 denotes weatherstrips of the doors, reference character 83 denotes glass run channels provided in the door sashes 76 and 78 with run channel holders 84 interposed therebetween, reference character 85 denotes door panes, and reference character 86 denotes a trim member. An arrow F indicates a vehicle front, an arrow R indicates a vehicle rear, an arrow IN indicates a vehicle inside, and an arrow OUT indicates a vehicle outside. These arrows indicate the same directions among the other drawings.

As described above, in the vehicle body coating, after coating of the body inner plate with the doors 75 and 77 being open, the body outer plate is performed with the doors 75 and 77 being closed. As indicated by arrow P in FIG. 12, in coating of the body outer plate, paint mist enters the vehicle inside through a clearance a between the door sashes 76 and 78 and is attached to the pillar outer panel 71 of the center pillar 74 in some cases.

FIG. 12 illustrates the weatherstrips 81 and 82, the glass run channels 83, the door panes 85, and the trim member 86. However, as illustrated in FIG. 13, coating is actually performed while the garnishes, for example, are not attached to the vehicle body. For example, coating is performed while the doors 75 and 77 are closed with a spacer sandwiched between the body and the doors. In this coating, a mist-attached portion 88 to which the paint mist 87 is attached is formed on the pillar outer panel 71, resulting in the possibility of deterioration of vehicle body appearance (aesthetic appearance).

That is, vehicle body coating typically includes under coating (electrodeosition coating) for, for example, rust prevention, intercoating for enhancing finished quality of coating and etching resistance, and top coating (base coating and clear coating) for enhancing weather resistance and design. However, unlike coating of the body outer plate, coating of the body inner plate does not require high degrees of finished quality and etching resistance, and thus, the intercoating is omitted in some cases. In addition, since coating of the body inner plate does not require a high degree of design, top coating different from that employed in the coating of the body outer plate can be performed. The omission of intercoating or difference of top coating may cause a difference in at least one of chroma, lightness, or hue between the pillar outer panel 71 as the body inner plate and the outer panels of the doors 75 and 77 as the body outer plates.

In this case, when paint mist is attached to the pillar outer panel 71 in the coating of the body outer plate, the resulting pillar outer panel 71 has a coated appearance with a partially different color tone.

In a case where the body outer plate is coated so as to have the same color tone as the vehicle inner plate, similar problems also occur when paint containing a flake-shaped brilliant material that affects chroma, lightness, or texture depending on its orientation is used.

Specifically, as illustrated in FIG. 13, when paint mist 87 from an electrostatic coating gun 89 is suspended and attached to the pillar outer panel 71, the orientation of a brilliant material 90 in the mist attached portion 88 decreases, as illustrated in FIG. 14. Consequently, the mist-attached portion 88 of the pillar outer panel 71 comes to have a whitish appearance under the influence of light diffuse reflection by the brilliant material 90. FIG. 14, reference character 91 denotes an electrodeposition paint film, reference character 92 denotes a base paint film, and reference character denotes 93 a clear paint film.

The present invention is focused on, for example, a phenomenon in which paint mist is attached to a portion of the pillar outer panel 71 above a portion around an upper edge line UL of the door body illustrated in FIG. 1 and a small amount or substantially no paint mist is attached to a portion above the portion around the upper edge line UL. As illustrated in FIG. 12, when the doors 75 and 77 are closed, the clearance a between the door sashes 76 and 78 is wide, but the clearance between the door bodies is narrow. As a result, the color tone or texture of the paint film differs between an upper portion of the pillar outer panel 71 to which a large amount of paint mist is attached and a lower portion of the pillar outer panel 71 to which a small amount of or substantially no paint mist is attached. Thus, when the front door 75 or the rear door 77 opens, the color tone or texture difference becomes conspicuous, and a viewer feels strangeness.

In view of this, the present invention has been made to prevent a viewer from feeling strangeness about the color tone or texture of a paint film of a pillar outer panel when the door opens.

Solution to the Problem

The present invention is directed not to measures in coating methods such as a composition of paint or masking but to measures of devising the shape of a pillar outer panel.

Specifically, a vehicle body presented herein includes a center pillar extending in a vehicle vertical direction and separating, in a vehicle longitudinal direction, an entrance opening that is covered and uncovered with a front door from an entrance opening that is covered and uncovered with a rear door. Door body upper edge lines of the front door and the rear door linearly extend in the vehicle longitudinal direction. An outer panel of each of the front door and the rear door is either coated with a paint at least one of whose chroma, lightness, or hue differs from those of a paint used for coating of a pillar outer panel of the center pillar, or coated with a paint containing a flake-shaped brilliant material.

In this vehicle body side structure, a panel surface of the pillar outer panel has a protrusion in a middle in the vehicle vertical direction such that at least part of a lower portion of the panel surface projects toward an outside of the vehicle body relative to an upper portion of the panel surface, and a start end of the protrusion is located at substantially an identical height to the door body upper edge line in at least a center portion in a pillar width of the pillar outer panel.

That is, as described above, an upper portion and a lower portion of the pillar outer panel relative to a portion around the door body upper edge line have different color tones or textures of the paint films in some cases depending on the presence of attached paint mist or the difference in the amount of attached paint mist. On the other hand, in the vehicle body side structure described above, the start end of the protrusion of the panel surface of the pillar outer panel is located at substantially the same height as the door body upper edge line. Thus, light reflection direction differs between the upper portion and the lower portion of the pillar outer panel relative to the portion around the door body upper edge line, and thus, the lightness also differs between the upper and lower portions. For example, the lightness of the portion below the line is higher than that of the portion above the line. As a result, even while the door is open, the difference in color tone or texture of the paint films becomes less conspicuous under the influence of the difference in lightness, and a viewer hardly feels strangeness. In other words, aesthetic appearance on a side of the vehicle body is enhanced.

In a preferred embodiment of the present invention, the start end of the protrusion of the panel surface forms a horizontal start line extending in the vehicle longitudinal direction, in the center portion in the pillar width of the pillar outer panel.

Specifically, since paint mist is attached mainly to a portion of the pillar outer panel above a portion around the door body upper edge line, the boundary at which the color tone or texture of the paint films changes extends in the vehicle longitudinal direction along the door body upper edge line. On the other hand, in this embodiment, the start end of the protrusion of the pillar outer panel extends in the vehicle longitudinal direction in correspondence to the boundary line at which the color tone or texture changes, and thus, the difference in color tone or texture between the paint films becomes much less conspicuous.

In a preferred embodiment of the present invention, the pillar outer panel has a center protruding surface extending downward from the start end of the protrusion in the pillar center portion in the pillar width and front and rear protruding surfaces extending downward on front and rear sides of the center protruding surface, the front and rear protruding surfaces decline forward and rearward, respectively, in the vehicle body, and the center protruding surface and the front and rear protruding surfaces form a ridge extending in the vehicle vertical direction.

In this configuration, the light reflection direction changes at the ridge between the center protruding surface and the front and rear protruding surfaces of the pillar outer panel, and thus, a difference in lightness occurs. Consequently, the center protruding surface visually becomes apparent. As a result, difference in color tone or texture between the paint films becomes much less conspicuous when paint mist is attached to the center portion in the pillar width above a portion around the door body upper edge line. In addition, even when paint mist is attached to the center portion in the pillar width in a portion below the portion around the door body upper edge line, the difference in lightness between the protruding surface in the center portion and its adjacent protruding surfaces makes the difference in color tone or texture between the paint films less conspicuous.

In a preferred embodiment of the present invention, the pillar outer panel has a center outer surface extending upward from the start end of the protrusion in the pillar center portion in the pillar width and front and rear outer surfaces extending upward on front and rear sides of the center outer surface, the front and rear outer surfaces decline forward and rearward, respectively, in the vehicle body, the center outer surface and the front and rear outer surfaces form a ridge extending in the vehicle vertical direction, and the ridge formed by the center outer surface of the pillar outer panel and the front and rear outer surfaces of the pillar outer panel is continuous to the ridge formed by the center protruding surface of the pillar outer panel and the front and rear protruding surface of the pillar outer panel.

That is, as described above, paint mist is easily attached to the center portion in the pillar width of the pillar outer panel above the door body upper edge line. In this embodiment, light reflection direction changes at the ridge between the outer surface and its adjacent outer surfaces above the door body upper edge line, and thus, a difference in lightness occurs between the surfaces. Accordingly, even when paint mist attached to the center portion in the pillar width causes a difference in color tone or texture of the paint films between the outer surface of the center portion in the pillar width and the front and rear outer surfaces, this difference is not conspicuous under the influence of the difference in lightness.

Thus, since the ridge formed by the center outer surface above the pillar outer panel and the front and rear outer surface is continuous to the ridge formed by the center protruding surface below the pillar outer panel and the front and rear protruding surfaces, even with the protrusion of the panel surface below a portion around the door body upper edge line, continuousness in the vehicle vertical direction of the whole pillar outer panel increases, thereby advantageously enhancing aesthetic appearance.

Each of the front door and the rear door may be a hinged door.

Advantages of the Invention

In the present invention, the panel surface has a protrusion in a middle in the vehicle vertical direction such that at least part of a lower portion of the panel surface projects toward the outside of the vehicle body relative to an upper portion of the panel surface. In addition, the start end of the protrusion is located at substantially an identical height to the door body upper edge line. Thus, even when the color tone or texture of the paint films differs between portions of the pillar outer panel located above and below a portion around the door body upper edge line, this difference in color tone or texture is not conspicuous because of the difference in lightness caused by the protrusion between the upper and the lower portions. As a result, aesthetic appearance of sides of the vehicle body can be enhanced without measures for paint mist such as masking.

DESCRIPTION OF EMBODIMENTS

An embodiment of the present invention will be described with reference to the drawings. The following embodiment is merely a preferred example in nature, and is not intended to limit the scope, applications, and use of the invention.

<Outline of Vehicle Body>

Figure 1:
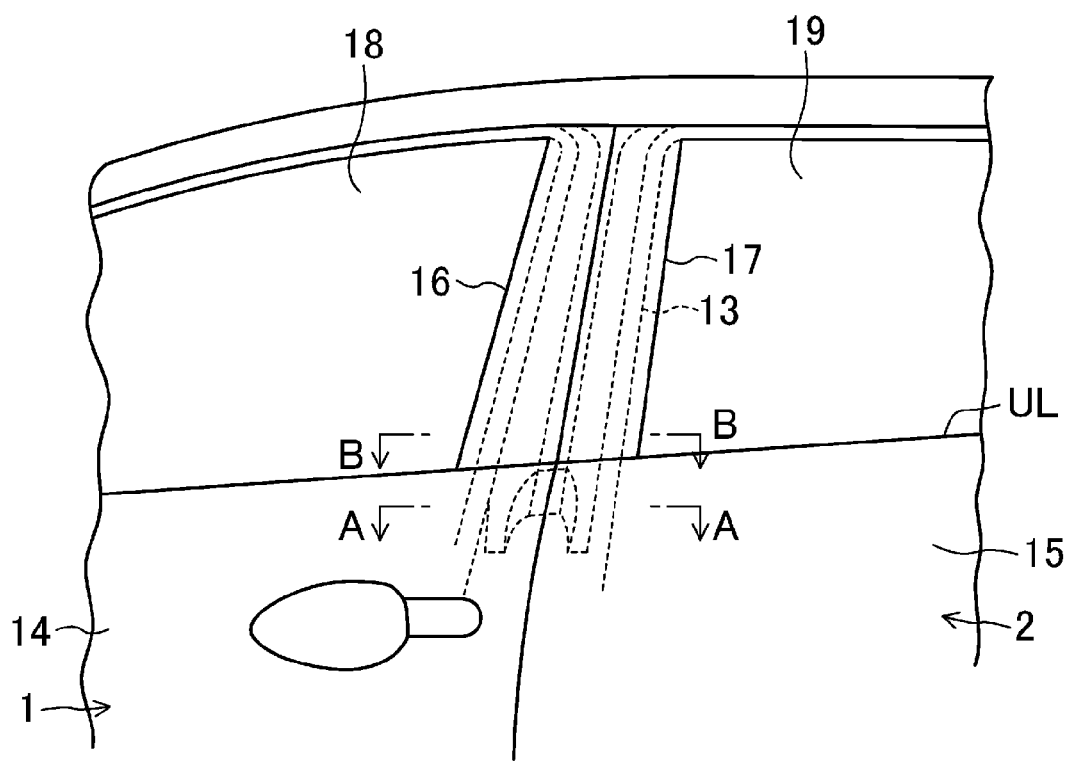
FIG. 1 is a side view illustrating part of an automobile.

FIG. 1 illustrates part of an automobile. In FIG. 1, reference character 1 denotes a front door, reference character 2 denotes a rear door, and reference character 3 denotes a center pillar. The doors 1 and 2 include door bodies 14 and 15, door sashes 16 and 17 extending upward from the door bodies 14 and 15, and door panes 18 and 19 that move up and down along the door sashes 16 and 17. Upper edge lines UL of the door bodies 14 and 15 linearly extend in the vehicle longitudinal direction.

Figure 2:
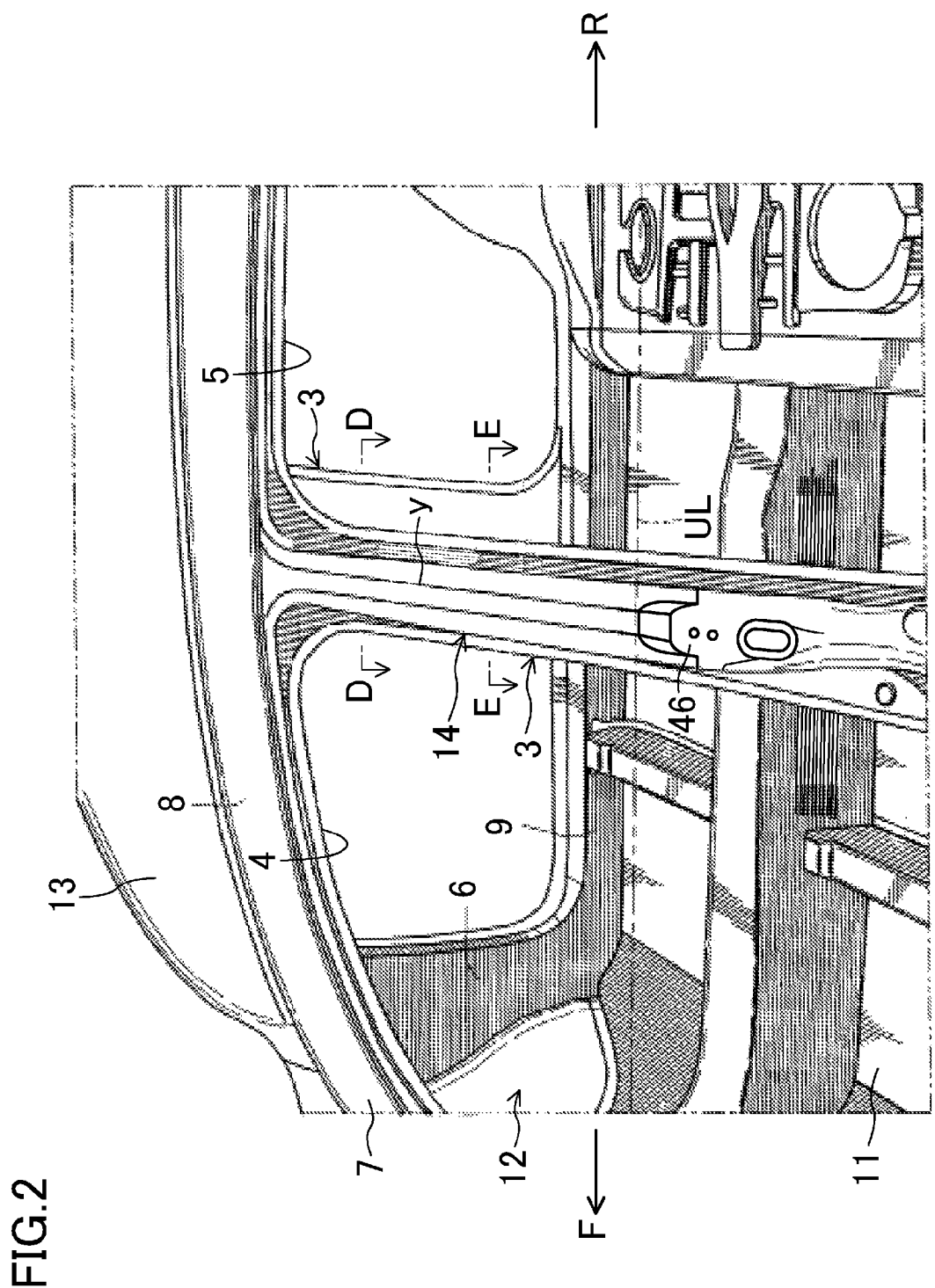
FIG. 2 is a perspective view illustrating part of a vehicle body without a door.

As illustrated in FIG. 2 in which the doors 1 and 2 are not shown, the center pillar 3 extends in the vehicle vertical direction and separates a front entrance opening 4 that is covered and uncovered with the front door 1 and a rear entrance opening 5 that is covered and uncovered with the rear door 2 from each other in the vehicle longitudinal direction.

The vehicle body has a symmetric shape, and the front entrance opening 4 is defined by a hinge pillar 6, a front pillar 7, a roof-side rail 8, the center pillar 3, and a side sill 9. The rear entrance opening 5 is defined by the center pillar 3, the roof-side rail 8, a rear pillar or a quarter pillar (not shown), and the side sill 9. The front door 1 is supported by the hinge pillar 6 at a front portion of the vehicle body such that the front pillar 1 can be opened or closed freely with a hinge. The rear door 2 is supported by the center pillar 3 such that the rear door 2 can be freely opened or closed with a hinge. In FIG. 2, reference character 11 denotes a floor panel of a cabin 12, and reference character 13 denotes a roof panel.

Figure 3:
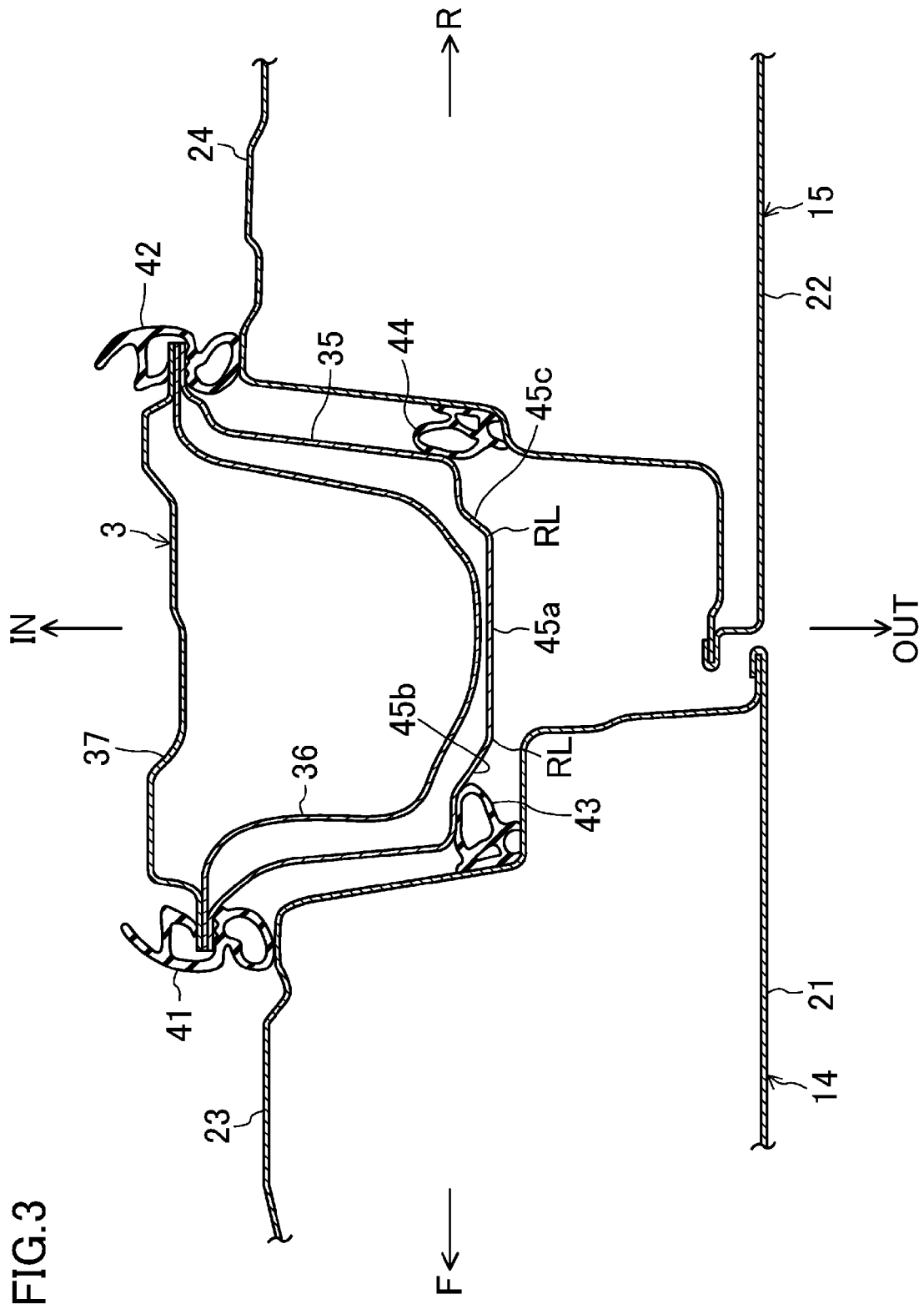
FIG. 3 is a cross-sectional view taken along line A-A in FIG. 1.
Figure 4:
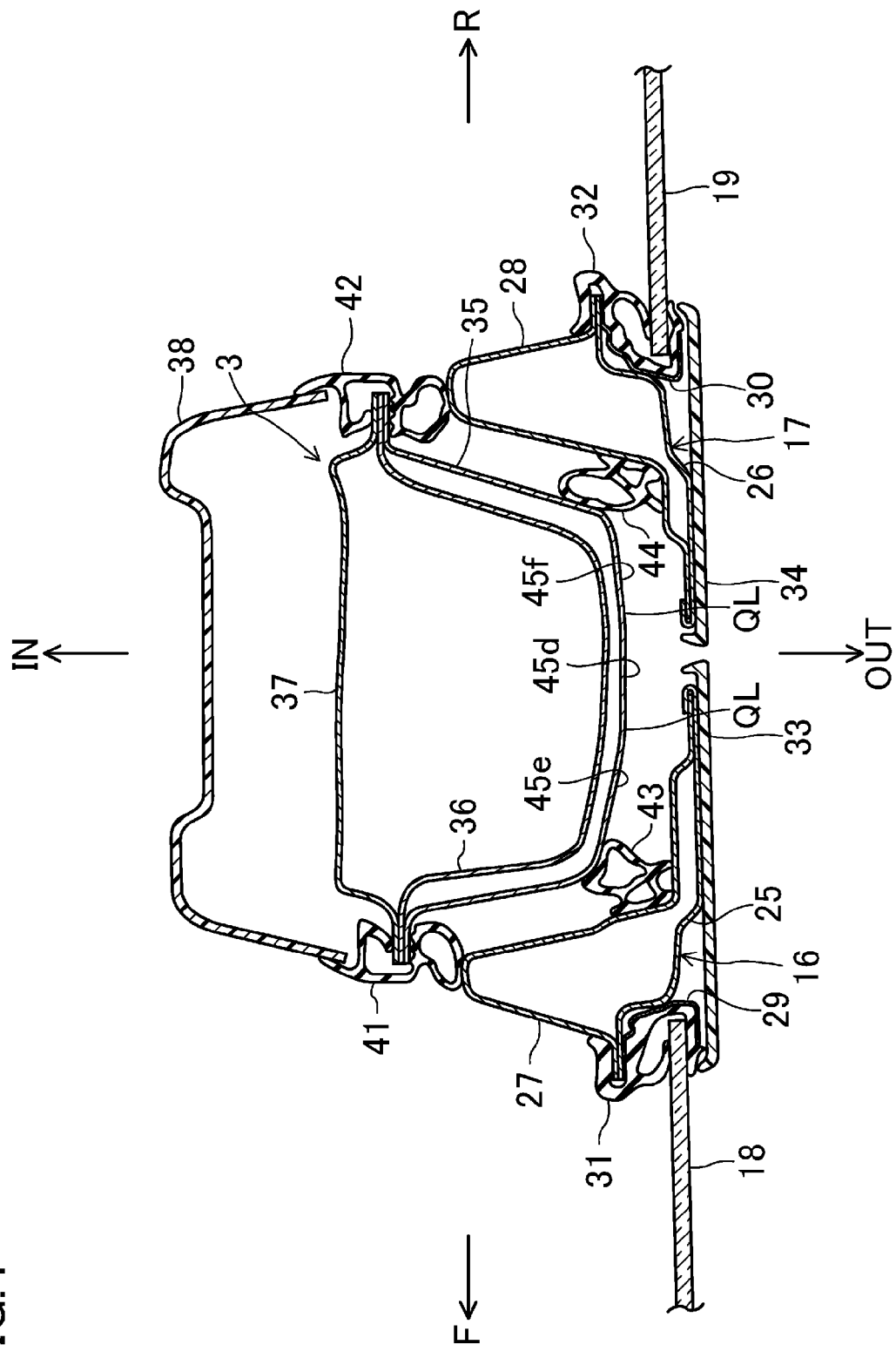
FIG. 4 is a cross-sectional view taken along line B-B in FIG. 1.

As illustrated in FIG. 3 (a cross-sectional view taken along A-A line in FIG. 1), the door bodies 14 and 15 are formed by joining outer panels 21 and 22 and inner panels 23 and 24 together. As illustrated in FIG. 4 (a cross-sectional view taken along line B-B in FIG. 1), the door sashes 16 and 17 are also formed by joining outer panels 25 and 26 and inner panels 27 and 28 together. Run channel holders 29 and 30 are provided from the door bodies 14 and 15 to the door sashes 16 and 17, and glass run channels 31 and 32 are fitted in the holders 29 and 30. The door panes 18 and 19 are fitted in the glass run channels 31 and 32 such that the door panes 18 and 19 can move up and down freely. The outer surfaces of the door sashes 16 and 17 are provided with garnishes 33 and 34.

As illustrated in FIGS. 3 and 4, the center pillar 3 includes a pillar outer panel 35, a reinforcement panel 36, and a pillar inner panel 37. Flanges of the panels 35-37 that are adjacent to each other in the vehicle longitudinal direction are joined together. The pillar outer panel 35 and the pillar inner panel 37 form a pillar-closed section extending in the vehicle vertical direction. The reinforcement panel 36 divides the pillar-closed section into a left portion and a right portion in the vehicle width direction. A center pillar trim 38 is disposed on a cabin side of the pillar inner panel 37.

Weatherstrips 41 and 42 are fitted in joint flange portions at the front and rear of the center pillar 3. The weatherstrips 41 and 42 includes seal portions that are in contact with the doors 1 and 2 while the doors 1 and 2 are closed, and lip portions in contact with a side edge of the center pillar trim 38. On the peripheries of the doors 1 and 2, weatherstrips 43 and 44 are provided from the door bodies 14 and 15 and the door sashes 16 and 17. The weatherstrips 43 and 44 are in contact with the peripheries of the entrance openings 4 and 5 of the vehicle body when the doors 1 and 2 are closed.

<Pillar Outer Panel 35 of Center Pillar 3>

Figure 5:
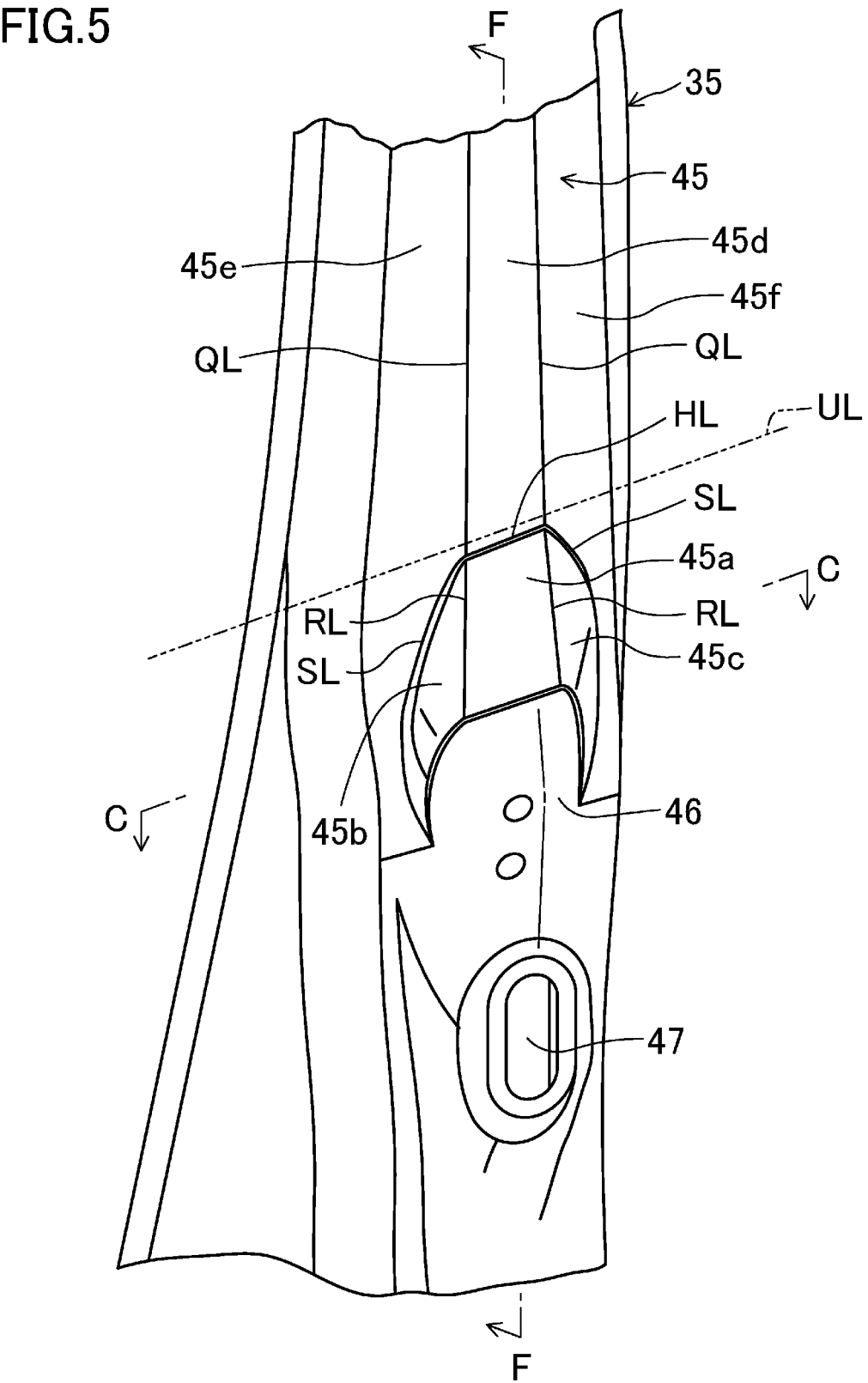
FIG. 5 is a perspective view illustrating part of an outer panel of a center pillar.

As illustrated in FIGS. 3 and 4, the pillar outer panel 35 has a substantially U shape in a horizontal cross section. As illustrated in FIG. 5, a panel surface of a panel portion 45 of the pillar outer panel 35 facing outside of the body has a protrusion in the middle in the vehicle vertical direction such that at least part of a portion below the middle portion projects to the outside of the body relative to a portion above the middle portion. A hinge attachment portion 46 having an attachment hole for the rear door 2 is provided in a lower portion of the panel portion 45 projecting to the outside of the body. An aperture 47 through which a wire harness passes is provided below the hinge attachment portion 46.

A start end of the protrusion of the panel surface of the outer panel portion 45 is located at substantially the same height as the door body upper edge lines UL at least in the center portion in the pillar width of the pillar outer panel 35. This configuration will be specifically described below.

The start end of the protrusion of the panel surface forms a horizontal start line HL extending in the vehicle longitudinal direction along the door body upper edge line UL, in the center portion in the pillar width of the pillar outer panel 35. The start end of the protrusion of the panel surface forms a slope start line SL continuous to the horizontal start line HL in the center portion and extending obliquely downward on the front and rear sides in the pillar width of the pillar outer panel 35. The horizontal start line HL is preferably at the same height as the door body upper edge line UL, or within a predetermined range of distance (e.g., about 15 mm) downward from the line UL. In this example, the horizontal start line HL is located slightly below the door body upper edge line UL.

The outer panel portion 45 includes: a center protruding surface 45a that gradually protrudes and extends downward from the horizontal start line HL in the center portion in the pillar width; and front and rear protruding surfaces 45b and 45c extending downward from the slope start lines SL on the front and rear sides of the pillar width. The center protruding surface 45a and the front and rear protruding surfaces 45b and 45c are continuous to the hinge attachment portion 46 projecting to the outside of the vehicle body. The center protruding surface 45a, the front protruding surface 45b and the rear protruding surface 45c together form a protrusion of the outer panel portion 45. The center protruding surface 45a is substantially flat in the vehicle longitudinal direction. The front and rear protruding surfaces 45b and 45c decline on the front and the rear sides of the vehicle body, respectively. Accordingly, the center protruding surface 45a and the front and rear protruding surfaces 45b and 45c form a ridge RL extending in the vehicle vertical direction.

The outer panel portion 45 includes a center outer surface 45d extending upward from the horizontal start line HL in the center portion in the pillar width in and outer surfaces 45e and 45f located on the front and rear sides of the center outer surface 45d and extending upward from the slope start lines SL. The center outer surface 45d is substantially flat in the vehicle longitudinal direction. The front and rear outer surfaces 45e and 45f decline toward the front and the rear, respectively, of the vehicle body. Accordingly, the center outer surface 45d and the front and rear outer surfaces 45e and 45f form a ridge QL extending in the vehicle vertical direction.

The ridge RL formed by the center protruding surface 45a and the front and rear protruding surfaces 45b and 45c and the ridge QL formed by the center outer surface 45d and the front and rear outer surfaces 45e and 45f are continuous in the vehicle vertical direction.

Figure 6:
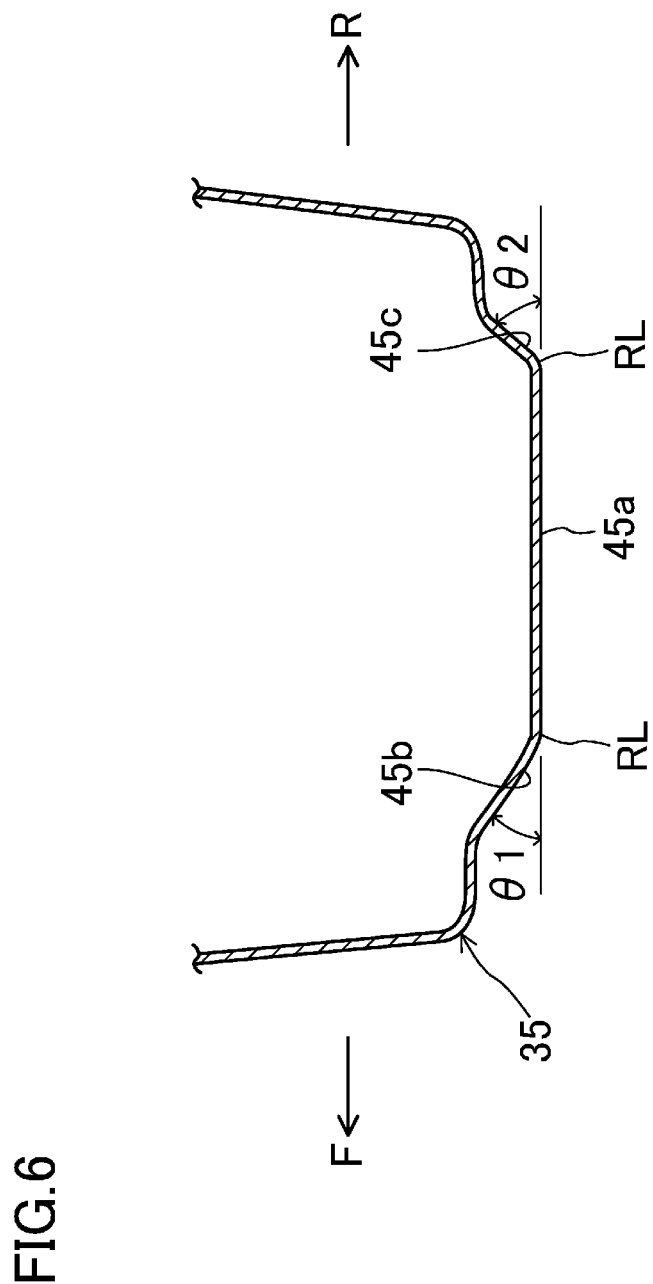
FIG. 6 is a cross-sectional view taken along line C-C in FIG. 5.

As illustrated in FIG. 6, an angle θ1 formed by the center protruding surface 45a and the front protruding surface 45b of the outer panel portion 45 and an angle θ2 formed by the center protruding surface 45a and the rear protruding surface 45c are about 20° to 60°. In this example, the angle θ1 is about 30°, and the angle θ2 is about 45°.

Figure 7:
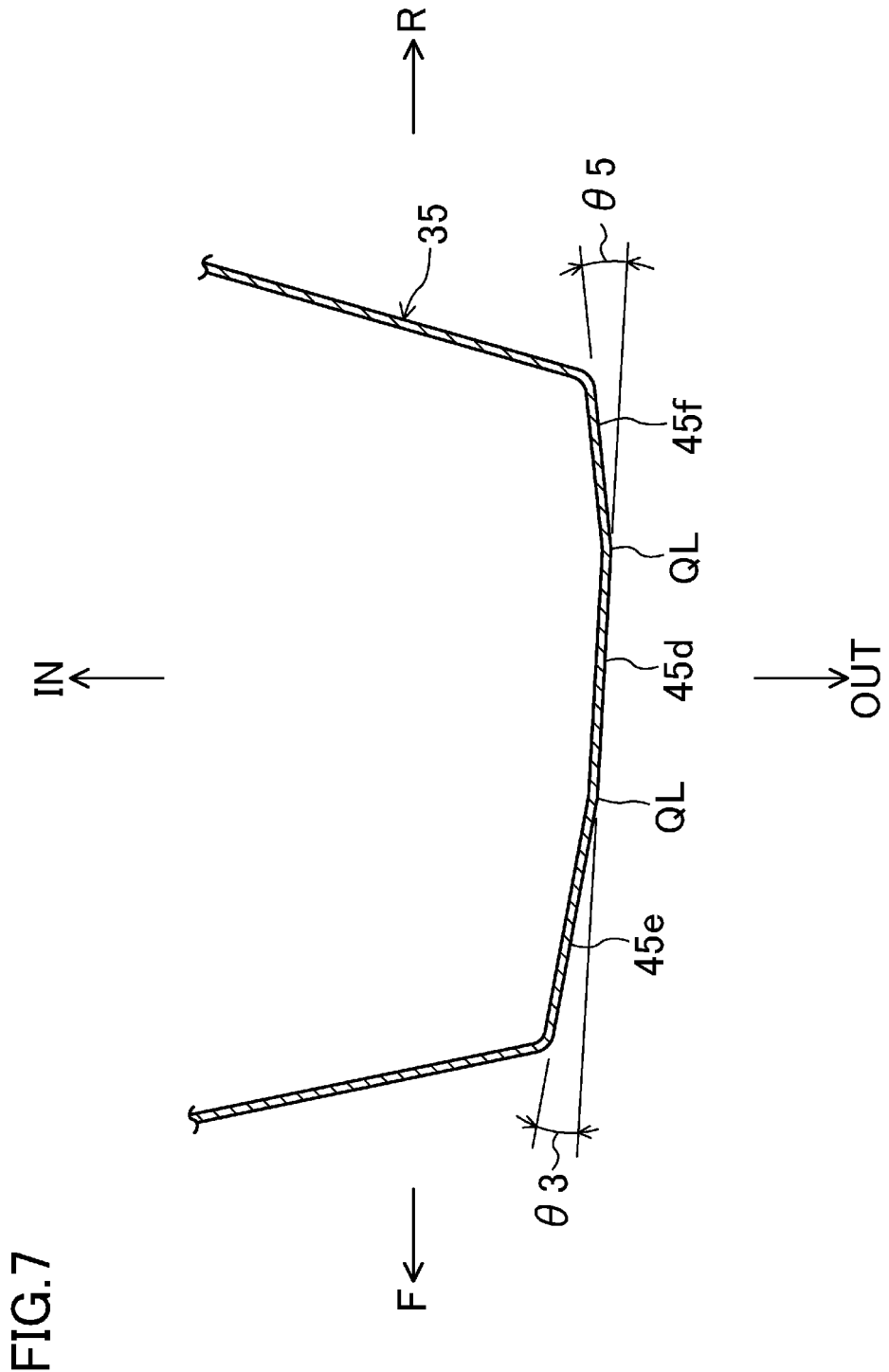
FIG. 7 is a cross-sectional view taken along line D-D in FIG. 2.
Figure 8:
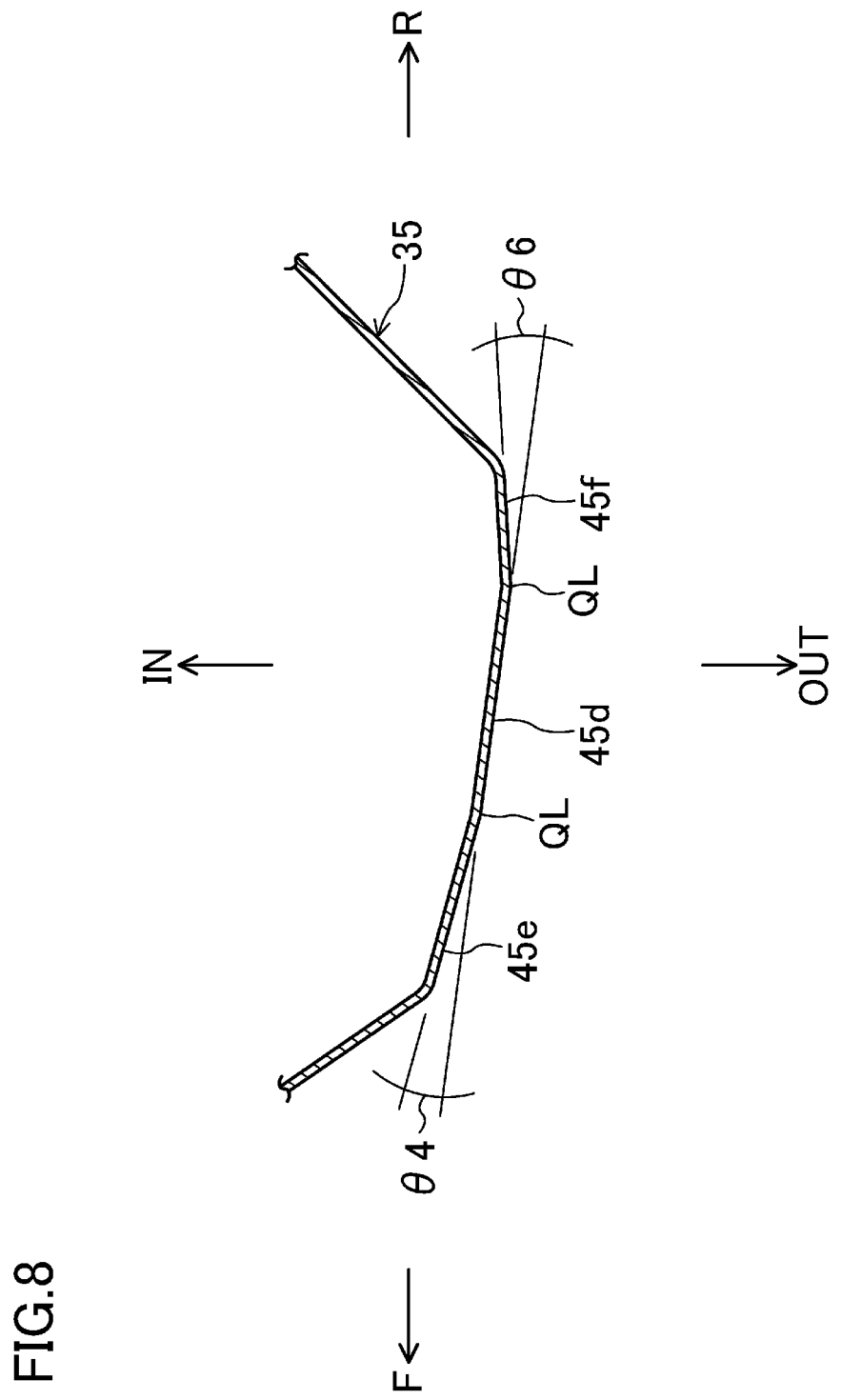
FIG. 8 is a cross-sectional view taken along line E-E in FIG. 2.

An angle θ3 formed by the center outer surface 45d and the front outer surface 45e of the outer panel portion 45 in a portion corresponding to upper portions in the vehicle vertical direction of the door sashes 16 and 17 as illustrated in FIG. 7, and an angle θ4 formed by the center outer surface 45d and the front outer surface 45e in a portion corresponding to intermediate portions of the door sashes 16 and 17 as illustrated in FIG. 8, are about 5° to 10°. In this example, the angles θ3 and θ4 are 8°.

As illustrated in FIG. 7, an angle θ5 formed by the center outer surface 45d and the rear outer surface 45f in a portion corresponding to upper portions in the vehicle vertical direction of the door sashes 16 and 17 and an angle θ6 formed by the center outer surface 45d and the rear outer surface 45f in a portion corresponding to intermediate portions of the door sashes 16 and 17 illustrated in FIG. 8 are about 8° to 10°. In this example, the angles θ5 and θ6 are 8°.

Here, when each of the angles θ1-θ6 is 5° or more, a shadow effect (i.e., occurrence of difference in lightness between adjacent panel surfaces) occurs.

<Coating>

In the vehicle body provided with a cationic electrodeosition coating, base coating for inner plates is performed on the body inner plates including the pillar outer panel 35 with the doors 1 and 2 being open. Next, with the doors 1 and 2 are closed, and intercoating and base coating (e.g., metallic base coating and color base coating) for outer plates are performed on the body outer plates including the doors 1 and 2. Then, the doors 1 and 2 are opened, clear coating is performed on the body inner plates. Thereafter, the doors 1 and 2 are closed, and top clear coating is performed on the body outer plates. Machines such as an air spray coating machine, an airless spray coating machine, and a rotary atomization coating machine are used for the intercoating, the base coating, and the clear coating.

Figure 9:
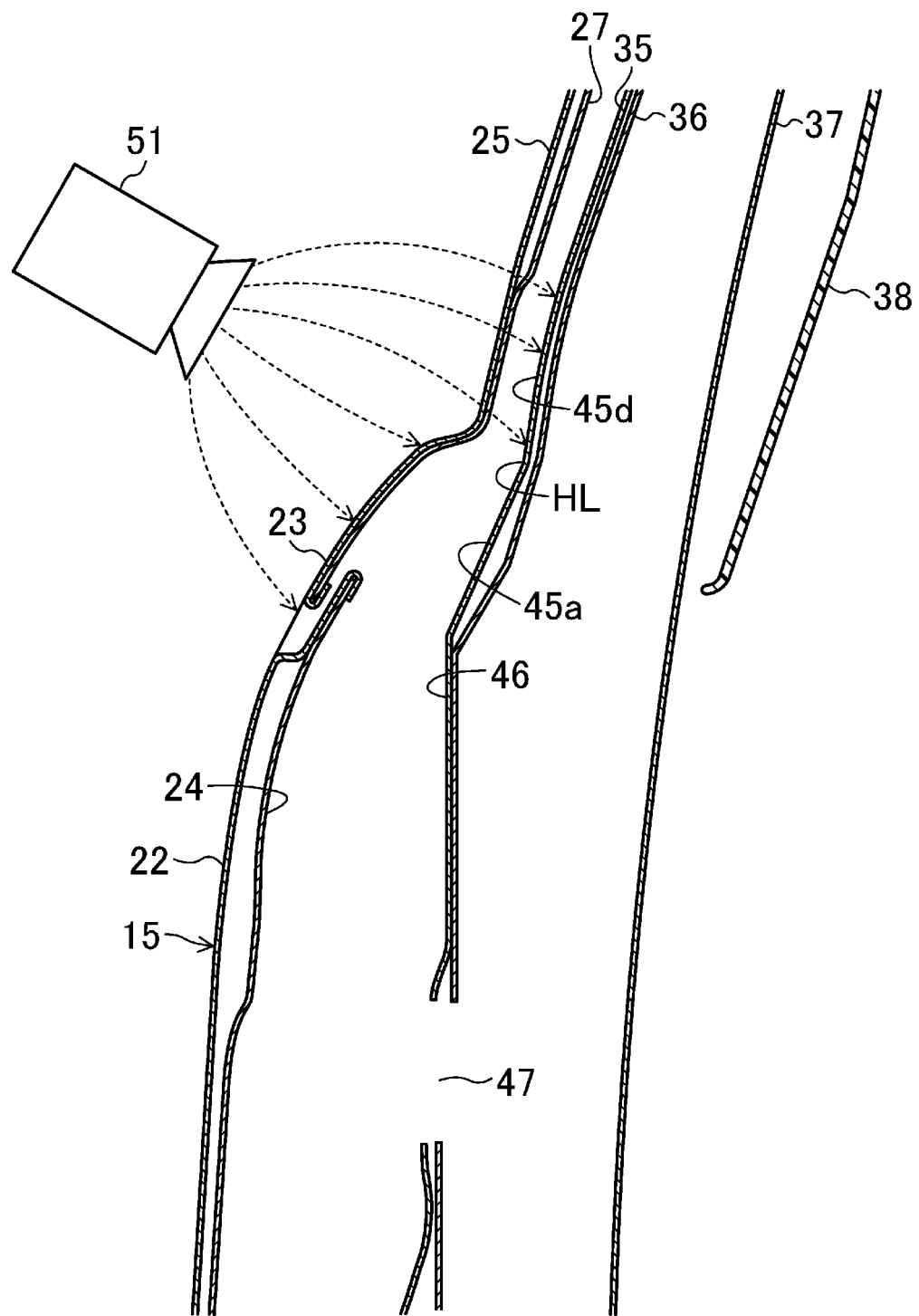
FIG. 9 is a cross-sectional view of the vehicle body taken along line F-F in FIG. 5.
Figure 11:
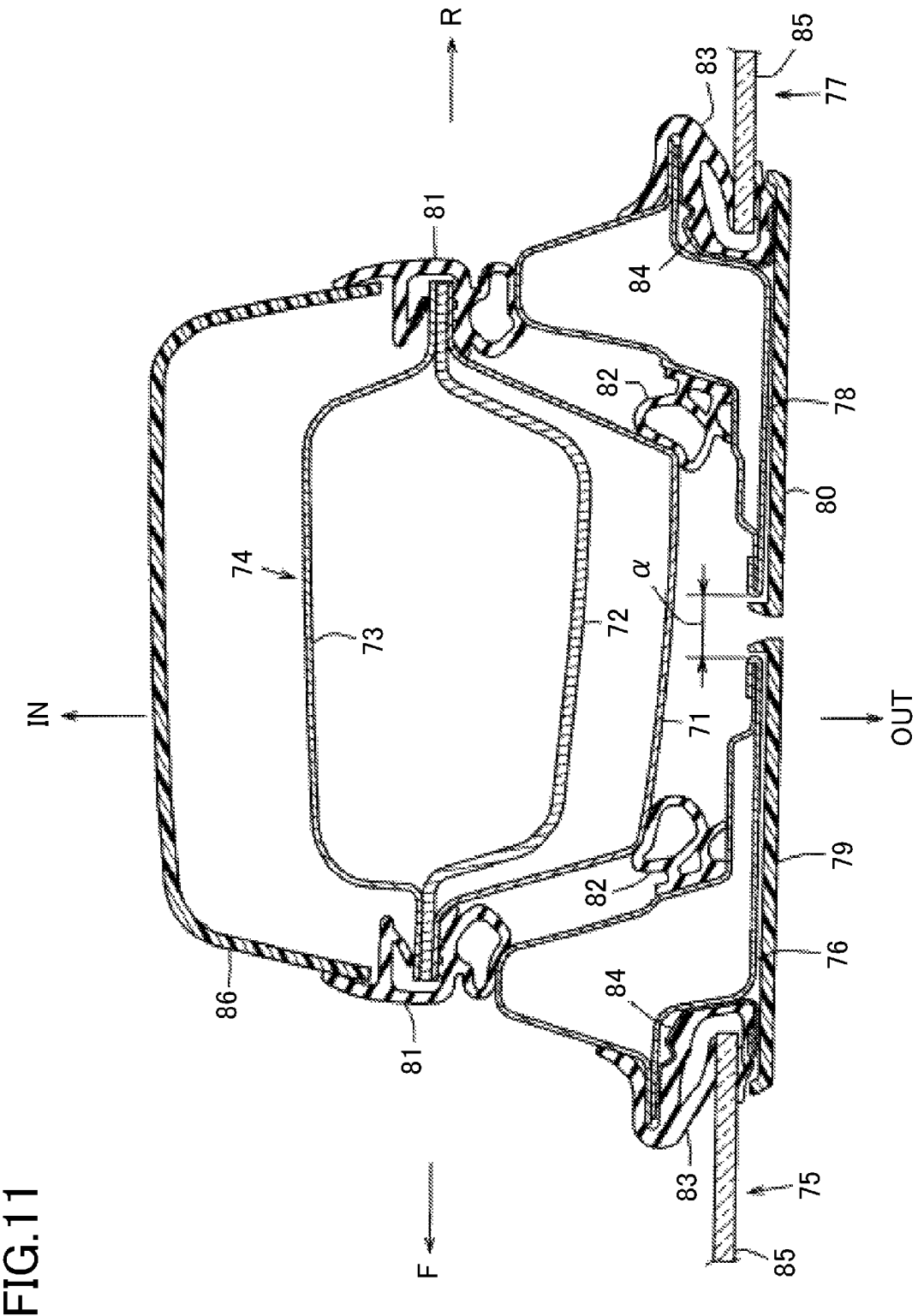
FIG. 11 is a view illustrating a typical example in a manner similar to FIG. 4.
Figure 12:
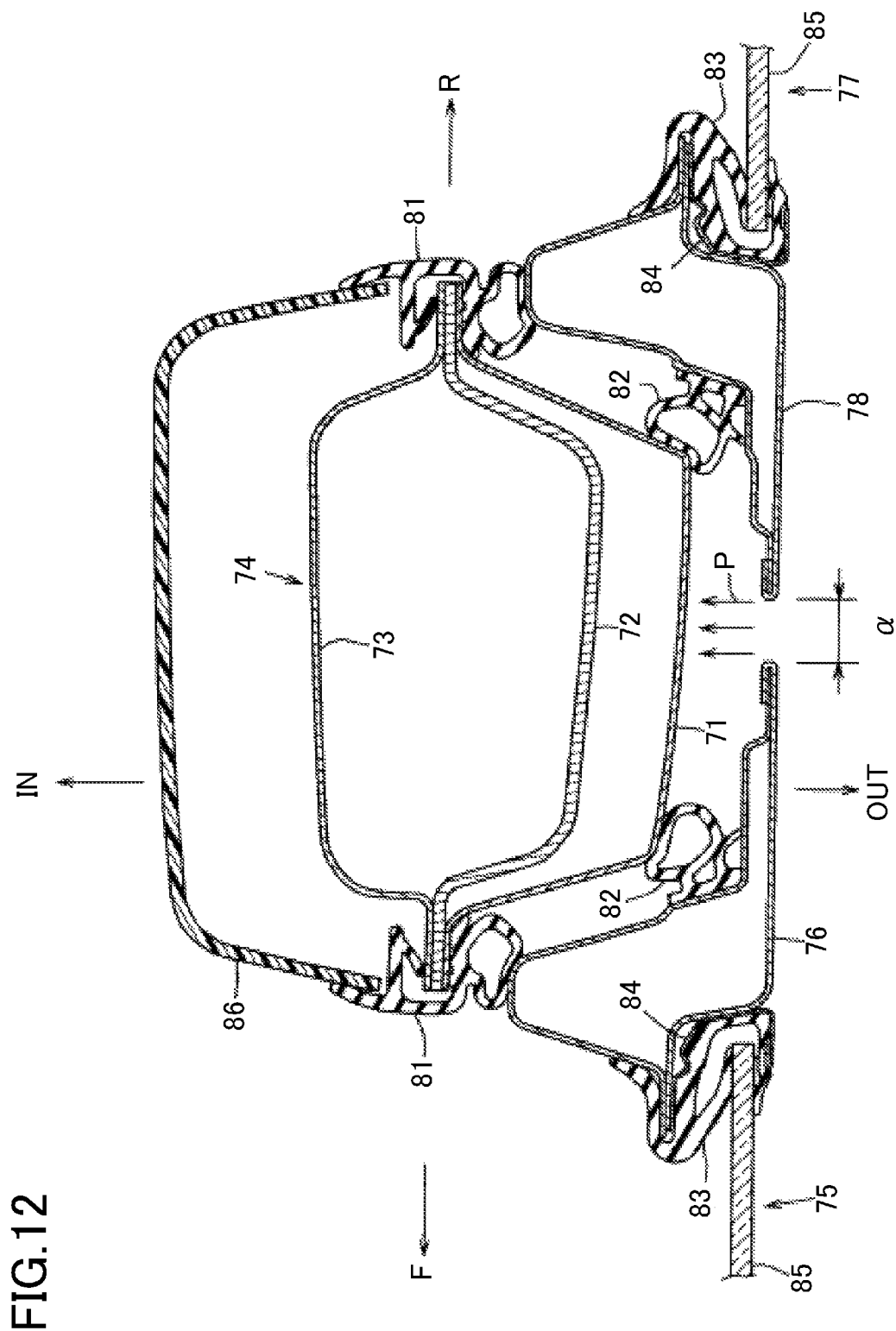
FIG. 12 is a cross-sectional view of the typical example without a garnish.

FIG. 9 illustrates a situation in which base coating is performed on the body outer plates with a coating gun 51. As illustrated in FIG. 3, substantially no clearance is formed between the door bodies 14 and 15 of the doors 1 and 2. In addition, the front door body 14 and the rear door body 15 overlap each other. On the other hand, as illustrated in FIG. 4, a relatively wide clearance is formed between the door sashes 16 and 17 (see clearance a in FIGS. 11 and 12). Thus, during the intercoating, the base coating, and the clear coating of the body outer plates, paint mist substantially does not enter the inside through the substantially no clearance between the door bodies 14 and 15, but paint mist enters the inside through the clearance a between the door sashes 16 and 17 and is attached to the pillar outer panel 35 of the center pillar 3.

Figure 13:
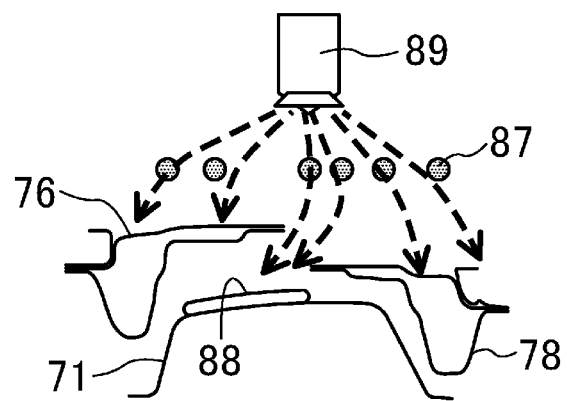
FIG. 13 is an explanatory drawing showing attachment of paint mist to an outer panel of a center pillar.

That is, a relatively large amount of paint mist is attached to a portion of the pillar outer panel 35 above the door body upper edge line UL, particularly to the center outer surface 45d. As illustrated in FIG. 13, some amount of paint mist enters a front portion and is attached to the front outer surface 45e. Substantially no paint mist is attached to the rear outer surface 45f. In addition, substantially no paint mist is attached to a portion below the door body upper edge line UL.

Figure 14:
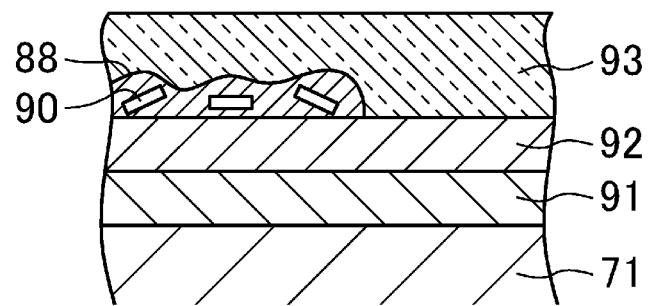
FIG. 14 is a cross-sectional view illustrating an example of a coating structure of a typical outer panel of a center pillar.

The color tone of the coating color slightly differs between the pillar outer panel 35 and the door outer panels 21 and 22 depending on the presence of intercoating and the difference in base paint in the body inner plates and the body outer plates. Thus, as described above, when a large amount of paint mist is attached to the center outer surface 45d of the pillar outer panel 35, this center outer surface 45d shows a color tone different from a portion below the door body upper edge line UL and the front and rear outer surfaces 45e and 45f. In addition, during metallic base coating of the body outer plates, when paint mist is attached to the center outer surface 45d of the pillar outer panel 35, orientation of the flake-shaped brilliant material included in this paint mist decreases (see FIG. 14). Accordingly, the center outer surface 45d comes to have a whitish appearance under the influence of light diffuse reflection caused by the brilliant material.

<Advantages of Shape of Pillar Outer Panel 35>

As described above, the center outer surface 45d of the pillar outer panel 35 has a color tone or a texture different from those of the portion below the door body upper edge line UL and the front and rear outer surfaces 45e and 45f. However, the variations in the panel surface of the pillar outer panel 35 substantially eliminate feeling of strangeness of viewers.

Figure 10:
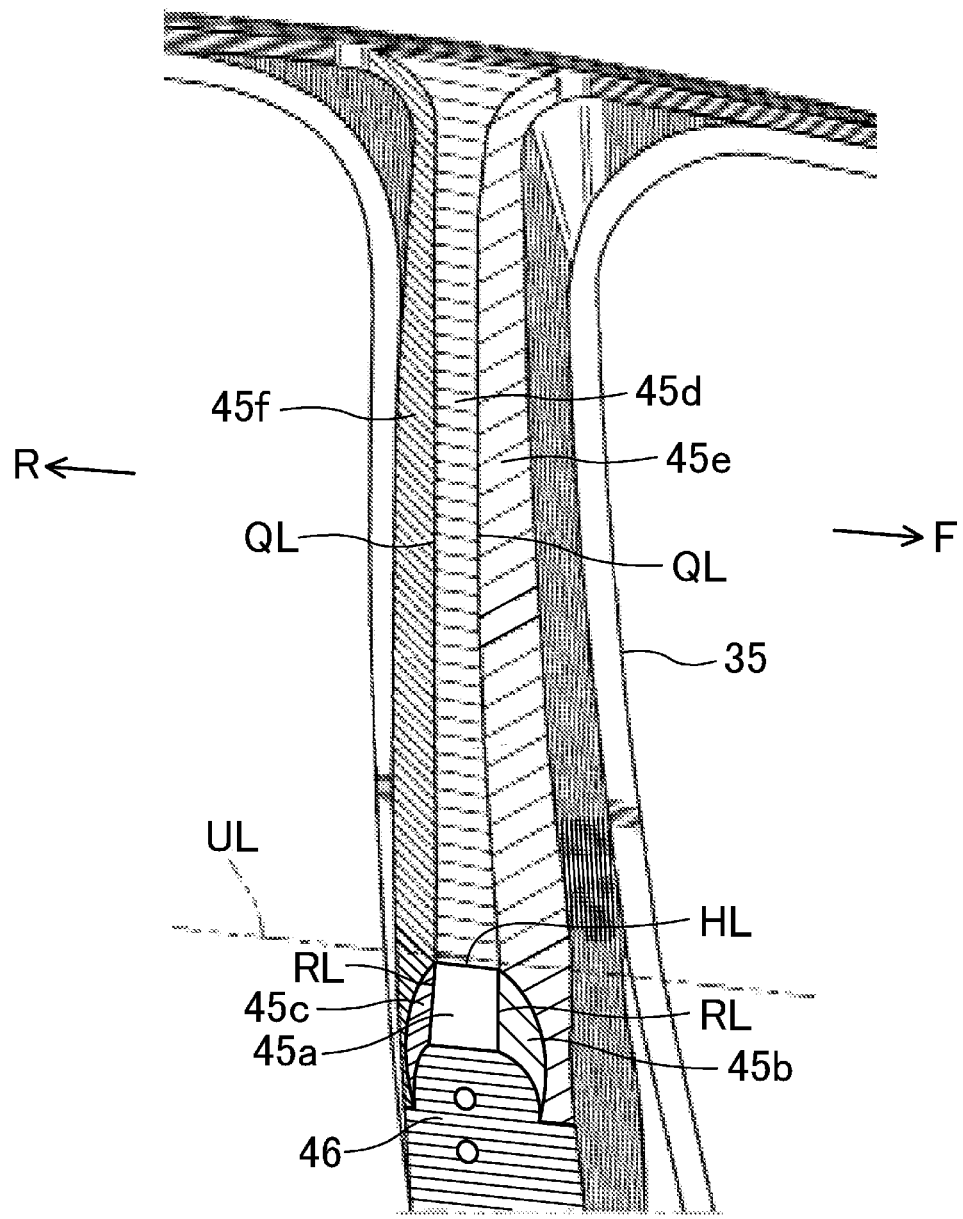
FIG. 10 is a perspective view in which difference in lightness among the surfaces of a pillar outer panel 35 by means of hatches upon irradiation from front and from diagonally above.

Specifically, FIG. 10 illustrates a difference in lightness among surfaces of the pillar outer panel 35 by means of hatches when the pillar outer panel 35 is irradiated with from front and from diagonally above. The difference in lightness among the surfaces reduces conspicuousness of the difference in color tone or texture caused by attachment of paint mist to the center outer surface 45d. This mechanism will be described below specifically.

First, in the pillar outer panel 35, the start end of the protrusion of the panel surface is located at substantially the same height as the door body upper edge line UL. Thus, light reflects in different directions between the upper center outer surface 45d and the lower center protruding surface 45a relative to the door body upper edge line UL, and thus, the center outer surface 45d and the center protruding surface 45a have different lightnesses. In FIG. 10, the lightness of the center protruding surface 45a is higher than that of the center outer surface 45d. Consequently, the difference in lightness reduces conspicuousness of the difference in color tone or texture between the upper and lower paint films relative to a portion around the door body upper edge line UL. That is, the viewer hardly feels strangeness.

In particular, since the center protruding surface 45a and the center outer surface 45d are separated from each other by the horizontal start line HL along the door body upper edge line UL, the difference in lightness becomes apparent. In addition, since light reflection direction differs between the center protruding surface 45a and the front and rear protruding surfaces 45b and 45c relative to the ridge RL, the center protruding surface 45a and the front and rear protruding surfaces 45b and 45c have different lightnesses. Accordingly, the center protruding surface 45a visually becomes apparent. As a result, difference in color tone or texture between the upper and lower portions relative to a portion around the door body upper edge line UL becomes less conspicuous.

Next, above the door body upper edge line UL, light reflection direction differs between the center outer surface 45d and the front and rear outer surfaces 45e and 45f relative to the ridge QL, and thus, lightness differs between the center outer surface 45d and the front and rear outer surfaces 45e and 45f. This difference in lightness reduces conspicuousness of the difference in color tone or texture between the center outer surface 45d and the front and rear outer surfaces 45e and 45f caused by attached paint mist.

Even in a case where a small amount of paint mist is attached to the center protruding surface 45a below a portion around the door body upper edge line UL so that a variation in color tone or texture occurs, the difference in lightness between the center protruding surface 45a and the front and rear protruding surfaces 45b and 45c makes the difference in color tone or texture less conspicuous.

In addition, since the ridge QL formed by the center outer surface 45d above a portion around the door body upper edge line UL and the front and rear outer surfaces 45e and 45f is continuous to the ridge RL formed by the lower center protruding surface 45a and the front and rear protruding surfaces 45b and 45c, even with the protrusion of the panel surface of the pillar outer panel 35 in a lower portion, continuousness in the vehicle vertical direction of the whole pillar outer panel 35 increases, thereby advantageously enhancing aesthetic appearance.

DESCRIPTION OF REFERENCE CHARACTERS 1 front door
2 rear door
3 center pillar
4, 5 entrance opening
14, 15 door body
16, 17 door sash
21, 22 outer panel of door body
25, 26 outer panel of door sash
35 pillar outer panel
45a center protruding surface
45b, 45c front and rear protruding surfaces
45d center outer surface
45e, 45f front and rear outer surfaces
UL door body upper edge line
HL horizontal start line
SL slope start line
RL, QL ridge

The invention claimed is:

1. A side structure of a vehicle body, the side structure comprising:
a center pillar extending in a vehicle vertical direction and separating, in a vehicle longitudinal direction, an entrance opening that is covered and uncovered with a front door from an entrance opening that is covered and uncovered with a rear door, wherein
door body upper edge lines of the front door and the rear door linearly extend in the vehicle longitudinal direction,
an outer panel of each of the front door and the rear door is either coated with a paint at least one of whose chroma, lightness, or hue differs from those of a paint used for coating of a pillar outer panel of the center pillar, or coated with a paint containing a flake-shaped brilliant material,
a panel surface of the pillar outer panel has a protrusion in a middle in the vehicle vertical direction such that at least part of a lower portion of the panel surface projects toward an outside of the vehicle body relative to an upper portion of the panel surface, and
a start end of the protrusion is located within a range of 15 mm below a door body upper edge line in at least a center portion in a pillar width of the pillar outer panel.

2. The side structure of claim 1, wherein
the start end of the protrusion of the panel surface forms a horizontal start line extending in the vehicle longitudinal direction, in the center portion in the pillar width of the pillar outer panel.

3. The side structure of claim 1, wherein
the pillar outer panel has a center protruding surface extending downward from the start end of the protrusion in the pillar center portion in the pillar width and front and rear protruding surfaces extending downward on front and rear sides of the center protruding surface,
the front and rear protruding surfaces decline forward and rearward, respectively, in the vehicle body, and
the center protruding surface and the front and rear protruding surfaces form a ridge extending in the vehicle vertical direction.

4. The side structure of claim 3, wherein
the pillar outer panel has a center outer surface extending upward from the start end of the protrusion in the pillar center portion in the pillar width and front and rear outer surfaces extending upward on front and rear sides of the center outer surface, the front and rear outer surfaces decline forward and rearward, respectively, in the vehicle body, the center outer surface and the front and rear outer surfaces form a ridge extending in the vehicle vertical direction, and the ridge formed by the center outer surface of the pillar outer panel and the front and rear outer surfaces of the pillar outer panel is continuous to the ridge formed by the center protruding surface of the pillar outer panel and the front and rear protruding surface of the pillar outer panel.

5. The side structure of claim 1, wherein each of the front door and the rear door is a hinged door.

6. The side structure of claim 2, wherein the pillar outer panel has a center protruding surface extending downward from the start end of the protrusion in the pillar center portion in the pillar width and front and rear protruding surfaces extending downward on front and rear sides of the center protruding surface, the front and rear protruding surfaces decline forward and rearward, respectively, in the vehicle body, and the center protruding surface and the front and rear protruding surfaces form a ridge extending in the vehicle vertical direction.

7. The side structure of claim 6, wherein the pillar outer panel has a center outer surface extending upward from the start end of the protrusion in the pillar center portion in the pillar width and front and rear outer surfaces extending upward on front and rear sides of the center outer surface, the front and rear outer surfaces decline forward and rearward, respectively, in the vehicle body, the center outer surface and the front and rear outer surfaces form a ridge extending in the vehicle vertical direction, and the ridge formed by the center outer surface of the pillar outer panel and the front and rear outer surfaces of the pillar outer panel is continuous to the ridge formed by the center protruding surface of the pillar outer panel and the front and rear protruding surface of the pillar outer panel.

\* \* \* \* \*